Nov. 4, 1924.　　　　　　　　　　　　　　　1,513,821
C. W. JONES
METHOD FOR EXTRACTING BROMINE
Filed May 7, 1920
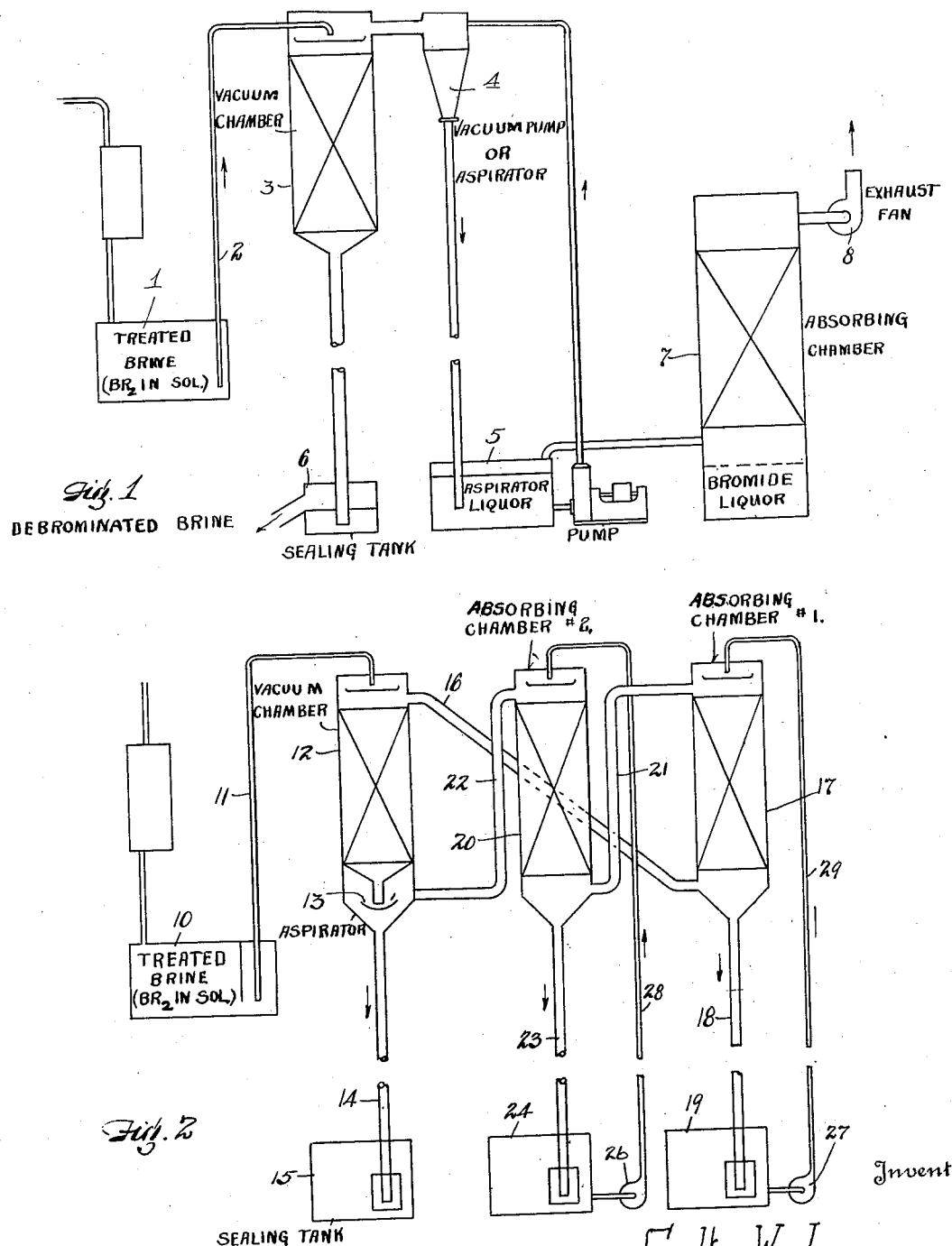

Patented Nov. 4, 1924.

1,513,821

UNITED STATES PATENT OFFICE.

COULTER W. JONES, OF MIDLAND, MICHIGAN, ASSIGNOR TO THE DOW CHEMICAL COMPANY, OF MIDLAND, MICHIGAN, A CORPORATION OF MICHIGAN.

METHOD FOR EXTRACTING BROMINE.

Application filed May 7, 1920. Serial No. 379,481.

*To all whom it may concern:*

Be it known that I, COULTER W. JONES, a citizen of the United States, and a resident of Midland, county of Midland, and State of Michigan, have invented a new and useful Improvement in Methods for Extracting Bromine, of which the following is a specification, the principle of the invention being herein explained and the best mode in which I have contemplated applying that principle, so as to distinguish it from other inventions.

The so-called Dow process for the extraction of bromine from natural brines as described for example in United States Letters Patent Re. No. 11,232, issued to H. H. Dow, April 12, 1892, involves the oxidation of the brine to set free the bromine therein from its chemical combination, whereupon such bromine goes into solution in the brine and is then recovered by an air blast, being finally absorbed with suitable reagent from the air used in blowing the same out of the brine. As just indicated, the treatment of the brine to free the bromine therein is generally referred to as an oxidation step, and as stated in the patent in question, may be accomplished electrolytically or by the agency of chlorine gas, or by other means.

The object of the present invention is to provide in connection with a process of the character in question an improved method of recovering the bromine after it has been thus set free in the brine. I have found, in other words, that contrary to expectation it is possible to successfully recover such bromine by subjecting the brine containing the same in solution to a sufficient vacuum under proper conditions. To the accomplishment of the foregoing and related ends the invention then consists of the steps hereinafter fully described, the annexed drawing and the following description illustrating but one of several ways in which the principle of the invention may be utilized.

In said annexed drawing:

Fig. 1 illustrates in diagrammatic fashion one apparatus suitable for carrying out my present improved process or method; while Fig. 2 similarly illustrates a modified construction of apparatus.

As stated above, it is a matter of indifference how the bromine is freed from its combination in the brine, and for the purpose in hand it is likewise a matter of indifference whether some slight excess or free chlorine remains in solution in the brine along with such free bromine, or whether steps have been taken to eliminate such chlorine before recovering the bromine. If the chlorine be not thus eliminated it will be understood that the bromine upon recovery will have to be purified by special means, if a pure product is desired. The present improvements of course are only incidentally concerned with the utilization made of the bromine after recovery and such purification, if the latter be necessary. In other words, the bromine may under certain condition be liquefied directly or it may be absorbed in the production of the final commercial product or an intermediate compound adaptable for the making of such final product.

As illustrated in Fig. 1 of the drawing, the apparatus comprises a suitable chamber 1 for oxidized brine to which the brine is supplied as required from a suitable oxidizer, in which it will be understood the bromine is set free as hereinbefore described. From such chamber 1, the brine with the bromine in solution is conducted through a pipe 2 to a closed chamber 3, in which a vacuum of the desired degree is maintained by means of a vacuum pump 4 connected therewith. This pump may be of any suitable design, but as shown is of the so-called siphon jet type, or in other words, a jet condenser. The liquid wherewith such pump operates is drawn from a chamber 5, to which it is again returned, being circulated over and over again through the pump, as will be readily understood.

I have found that when the oxidized brine is submitted to a vacuum of a little over 25 inches mercury, the greater part of the free bromine dissolved therein is readily given up; in other words, such bromine boils off and may be withdrawn through the pump. Preferably the chamber 3 is filled with cracked porcelain, or like material, and the oxidized brine is allowed to trickle down over such filling, a trap 6 being provided for the escape of the liquid so that the chamber does not fill up with liquid. Such breaking up of the brine as by the tower filling just described, or equivalent mechanical means, I have found will increase the rate of the halogen escape from the brine. The apparatus will be most conveniently operated at ordinary room temperature, although an increase in temperature will facilitate the withdrawal of the halogen.

Where it is desired to make liquid bromine, the siphon jet pump 5 is operated to circulate the same liquor continuously, the entrained gas being trapped or separated and put through a condenser. The liquor that is pumped over and over through the jet would become so-called "red water" or saturated bromine solution, which could be used in itself in making various bromides, if desired. However, to make such bromides it is more convenient to simply run an alkaline solution, such as a solution of sodium or potassium carbonate, through the pump 5, as a result of which the bromine is directly absorbed, and as the solution of resulting bromide becomes sufficiently strong it may be withdrawn either gradually or in batches.

In case it is not considered desirable to pump an absorbing reagent through the jet condenser 4, a supplemental absorbing tower 7 may be provided having a suitable filling, as will be readily understood, over which a solution of such reagent flows downwardly while the bromine gas is drawn upwardly therethrough from chamber 5 by means of an exhaust fan 8, although such counter-flow is not essential.

In Fig. 2 I show as indicated a modified construction of apparatus in which the previously oxidized brine is supplied from a tank or chamber 10 through a pipe 11 to a vacuum chamber or vaporizer 12 having the same general construction as chamber 3 in the first described construction. However, instead of having a vacuum pump or jet condenser located without such chamber, the air is evacuated therefrom through the medium of a device 13 located in the lower portion of such chamber by the suction created by the flow of brine downwardly through the leg 14, as in other familiar types of vacuum apparatus. The lower end of such leg is sealed in a well 15 as will be readily understood. The vapor line 16 is connected with the upper portion of chamber 12 leading thence to the lower portion of an absorbing chamber 17, which likewise has a leg 18 depending at its lower end in a well 19. A second absorbing chamber 20 has its lower portion connected with the upper portion of said chamber 17 by means of a duct 21 and its upper portion connected with the lower portion of the vaporizer 12 by means of a duct 22, said second absorbing chamber 20 likewise having a leg 23 depending into a well 24. From the foregoing construction it will be seen that a closed air line exhausts between the upper portion of said vaporizer through the several absorbing chambers to the lower portion of said vaporizer below the device 13 so that a vacuum may be maintained throughout the entire apparatus. Pumps 26 and 27 with corresponding pipes 28 and 29 serve to elevate the absorbing liquid from wells 24 and 19 respectively to the tops of chambers 20 and 17 respectively, as need not be explained in detail.

Other modes of applying the principle of my invention may be employed instead of the one explained, change being made as regards the steps herein disclosed, provided those stated by any one of the following claims or their equivalents be employed.

I therefore particularly point out and distinctly claim as my invention:—

1. In a method of extracting bromine from bromide-containing brine, the steps which consist in treating such brine to free the bromine from its chemical combination, and thereupon subdividing such brine and simultaneously subjecting the same to a vacuum sufficient to withdraw the free bromine absorbed therein.

2. In a method of extracting bromine from bromide-containing brine, the steps which consist in treating such brine to free the bromine from its chemical combination, and thereupon passing such brine over a filling in a closed chamber, whereby such brine is subdivided, and simultaneously subjecting such chamber to a sufficient vacuum to withdraw the free bromine absorbed in such brine.

Signed by me at Midland, Mich., this 3d day of May, 1920.

COULTER W. JONES.